United States Patent
Lee et al.

(10) Patent No.: US 9,084,953 B2
(45) Date of Patent: Jul. 21, 2015

(54) FIBER WEB, PREPARATION METHOD THEREOF, AND FILTER INCLUDING FIBER WEB

(75) Inventors: Youn Eung Lee, Daejeon (KR); Jin Kyu Lee, Busan (KR); Young Taek Oh, Seoul (KR)

(73) Assignee: SHENZHEN WOTE ADVANCED MATERIALS CO., LTD., Shenzhen (CN)

( * ) Notice: Subject to any disclaimer, the term of this patent is extended or adjusted under 35 U.S.C. 154(b) by 0 days.

(21) Appl. No.: 13/996,745

(22) PCT Filed: Nov. 28, 2011

(86) PCT No.: PCT/KR2011/009099
§ 371 (c)(1),
(2), (4) Date: Jun. 21, 2013

(87) PCT Pub. No.: WO2012/093775
PCT Pub. Date: Jul. 12, 2012

(65) Prior Publication Data
US 2013/0269304 A1 Oct. 17, 2013

(30) Foreign Application Priority Data

Jan. 5, 2011 (KR) ........................ 10-2011-0001081

(51) Int. Cl.
| | |
|---|---|
| *B01D 39/16* | (2006.01) |
| *D04H 1/435* | (2012.01) |
| *D04H 1/56* | (2006.01) |
| *D04H 3/16* | (2006.01) |
| *D04H 1/4382* | (2012.01) |
| *D04H 1/728* | (2012.01) |

(52) U.S. Cl.
CPC .............. *B01D 39/163* (2013.01); *D04H 1/435* (2013.01); *D04H 1/4382* (2013.01); *D04H 1/56* (2013.01); *D04H 1/728* (2013.01); *D04H 3/16* (2013.01)

(58) Field of Classification Search
CPC ......... D04H 1/435; D04H 1/56; D04H 1/758; D04H 1/728; D04H 1/16; D04H 1/361; D04H 1/4382; B01D 39/163
USPC ......... 55/528, 500, 511, 520; 264/6; 528/361; 428/343, 349, 420, 480; 156/3.3, 79, 156/83, 280, 309.6, 324.4
See application file for complete search history.

(56) References Cited

U.S. PATENT DOCUMENTS

| | | | | |
|---|---|---|---|---|
| 5,432,225 | A | * | 7/1995 | Nakamura et al. ............ 524/495 |
| 6,030,701 | A | * | 2/2000 | Johnson et al. ............... 428/343 |
| 6,485,589 | B1 | * | 11/2002 | Johnson et al. ................. 156/83 |
| 2008/0308130 | A1 | * | 12/2008 | Scher et al. ..................... 134/18 |
| 2010/0129628 | A1 | * | 5/2010 | Young .......................... 428/219 |

FOREIGN PATENT DOCUMENTS

| | | |
|---|---|---|
| JP | 2000119952 A | 4/2000 |
| JP | 2004100047 A | 4/2004 |
| JP | 2008221555 A | 9/2008 |

OTHER PUBLICATIONS

Written Opinion for International Application No. PCT/KR2011/009099 dated Jun. 28, 2012.
International Search Report for International Application No. PCT/KR2011/009099 dated Jun. 28, 2012.

* cited by examiner

*Primary Examiner* — Jason M Greene
*Assistant Examiner* — Karla Hawkins
(74) *Attorney, Agent, or Firm* — Osha Liang LLP

(57) ABSTRACT

Disclosed are a fiberweb, a preparation method thereof, and a filter including the fiberweb. The fiberweb includes a wholly aromatic liquid crystal polyester resin which includes a repeating unit induced from a hydroxybenzoic acid and a repeating unit induced from a hydroxynaphthoic acid, but does not include a repeating unit induced from an aromatic dicarboxylic acid.

9 Claims, No Drawings

FIBER WEB, PREPARATION METHOD THEREOF, AND FILTER INCLUDING FIBER WEB

TECHNICAL FIELD

The present invention relates to a fiberweb, a method of preparing the same, and a filter including the fiberweb, and more particularly, to a fiberweb including a wholly aromatic liquid crystal polyester resin that includes a repeating unit induced from a hydroxybenzoic acid and a repeating unit induced from a hydroxynaphthoic acid, but does not include a repeating unit induced from an aromatic dicarboxylic acid, a method of preparing the same, and a filter including the fiberweb.

BACKGROUND ART

Conventional filters for home and industrial uses are prepared by spinning polyethylene (PE), polypropylene (PP), or polyethylene terephthalate (PET) by using various melt-spinning methods such as a melt-blown method or a spun bonding method, or a wet process whereby a polymer is dissolved in a solvent to form a membrane. The melt-spinning methods have advantages such as low manufacturing costs, simplified manufacturing processes, and high productivity, while the methods incur limitations on raw materials. The wet process is time-consuming and cost-consuming, requires a large amount of a solvent used, and has low safety.

In addition, PE, PP, and PET have low thermal resistance and thus filters including these compounds may lose their functions because polymers are deteriorated or melted at a high temperature, and the solubility of these compounds with respect to a solvent is poor and thus it is difficult to use them in an electrospinning method, which is used to prepare high-performance filters.

DETAILED DESCRIPTION OF THE INVENTION

Technical Problem

The present invention provides a fiberweb including a wholly aromatic liquid crystal polyester resin that includes a repeating unit induced from a hydroxybenzoic acid and a repeating unit induced from a hydroxynaphthoic acid, but does not include a repeating unit induced from an aromatic dicarboxylic acid.

The present invention also provides a method of preparing the fiberweb, the method including electrospinning a solution containing a wholly aromatic liquid crystal polyester resin or melt-spinning a wholly aromatic liquid crystal polyester resin.

The present invention also provides a filter including the fiberweb.

Technical Solution

According to an aspect of the present invention, there is provided a fiberweb including a wholly aromatic liquid crystal polyester resin that includes a repeating unit induced from a hydroxybenzoic acid and a repeating unit induced from a hydroxynaphthoic acid, but does not include a repeating unit induced from an aromatic dicarboxylic acid.

The hydroxybenzoic acid may be one selected from the group consisting of p-hydroxybenzoic acid, 3-hydroxybenzoic acid, 2-hydroxybenzoic acid, and any combinations thereof.

The hydroxynaphthoic acid may be one selected from the group consisting of 6-hydroxy-2-naphthoic acid, 3-hydroxy-2-naphthoic acid, 2-hydroxy-1-naphthoic acid, 1-hydroxy-2-naphthoic acid, and any combinations thereof.

The wholly aromatic liquid crystal polyester resin may include 70 to 80 parts by mol of the repeating unit induced from the hydroxybenzoic acid and 20 to 30 parts by mol of the repeating unit induced from the hydroxynaphthoic acid.

The fiberweb may include fibers having an average diameter in a range of 1 to 9,000 nm.

According to another aspect of the present invention, there is provided a method of preparing a fiberweb, the method including electrospinning a wholly aromatic liquid crystal polyester resin-containing solution or melt-spinning a wholly aromatic liquid crystal polyester resin.

The wholly aromatic liquid crystal polyester resin-containing solution may include one solvent selected from the group consisting of trifluoromethanesulfonic acid, pentafluorophenol, 3,5-bis(trifluoromethyl)phenol, p-fluorophenol, p-chlorophenol, 1,1,2,2-tetrachloroethane, trifluoroacetic acid, hexafluoroisopropanol, chloroform, dichloromethane, tetrahydrofuran, dioxane, and any combinations thereof.

According to another aspect of the present invention, there is provided a filter including the fiberweb.

The filter may be an ultra low penetration air (ULPA) filter or a high efficiency particulate air (HEPA) filter.

Advantageous Effects

According to the one or more embodiments of the present invention, there is provided a fiberweb including a wholly aromatic liquid crystal polyester resin that includes a repeating unit induced from a hydroxybenzoic acid and a repeating unit induced from a hydroxynaphthoic acid, but does not include a repeating unit induced from an aromatic dicarboxylic acid, thereby exhibiting high thermal resistance and physical strength.

There is also provided a filter including the fiberweb, thereby having a high capturing capacity, having a low pressure loss with respect to the same capturing efficiency, being capable of removing pollutant nanoparticles, and effectively blocking the flow of a variety of microbacteria.

BEST MODE

Hereinafter, a fiberweb according to an embodiment of the present invention will be described in detail. As used herein, the term "and/or" includes any and all combinations of one or more of the associated listed items.

According to an embodiment of the present invention, a fiberweb includes a wholly aromatic liquid crystal polyester resin that includes a repeating unit induced from a hydroxybenzoic acid and a repeating unit induced from a hydroxynaphthoic acid, but does not include a repeating unit induced from an aromatic dicarboxylic acid.

The term "fiberweb" as used herein refers to a web formed such that a plurality of fibers are aligned and combined with one another, and the term "fiber" as used herein refers to a substance seen as a thin, long thread when being observed under magnification.

The fiberweb has high thermal resistance and physical strength due to inherent characteristics of the wholly aromatic liquid crystal polyester resin, which is the main raw material.

The wholly aromatic liquid crystal polyester resin may include 70 to 80 parts by mol of the repeating unit induced from the hydroxybenzoic acid and 20 to 30 parts by mol of the repeating unit induced from the hydroxynaphthoic acid. If the amounts of the repeating unit induced from the hydroxybenzoic acid and the repeating unit induced from the hydroxynaphthoic acid are within the ranges described above, the wholly aromatic liquid crystal polyester resin may be easily prepared and may have sufficient thermal resistance and physical strength as a filter material.

The wholly aromatic liquid crystal polyester resin may be prepared according to the following steps:

(a) Synthesizing a wholly aromatic liquid crystal polyester prepolymer by condensation polymerizing at least one monomer; and (b) Synthesizing a wholly aromatic liquid crystal polyester resin by solid phase condensation polymerizing the prepolymer.

The monomer used in step (a) includes: hydroxybenzoic acid selected from the group consisting of p-hydroxybenzoic acid, 3-hydroxybenzoic acid, 2-hydroxybenzoic acid, and any combinations thereof; and hydroxynaphthoic acid selected from the group consisting of 6-hydroxy-2-naphthoic acid, 3-hydroxy-2-naphthoic acid, 2-hydroxy-1-naphthoic acid, 1-hydroxy-2-naphthoic acid and any combinations thereof, but does not include aromatic dicarboxylic acid such as isophthalic acid, 2,6-naphthalene dicarboxylic acid, terephthalic acid, and phthalic acid. The monomer used in step (a) may further include aromatic diol, aromatic diamine, aromatic hydroxylamine, and/or aromatic amino carboxylic acid.

In addition, metal acetate may further be used as a catalyst that facilitates the synthesis of the wholly aromatic liquid crystal polyester prepolymer. The metal acetate may be at least one selected from the group consisting of magnesium acetate, potassium acetate, calcium acetate, zinc acetate, manganese acetate, lead acetate, antimony acetate, and cobalt acetate. The amount of the metal acetate may be 0.10 parts by weight or less based on 100 parts by weight of the monomer.

The synthesis of step (a) may be performed using solution condensation polymerization or bulk condensation polymerization. In addition, a monomer (i.e., acylated monomer) that has reactivity enhanced by pre-treatment with chemicals such as an acylating agent (particularly, acetylating agent) may be used in step (a) in order to facilitate the condensation polymerization.

For the solid phase condensation polymerization in step (b), the prepolymer is required to be heated using, for example, a heating plate, hot air, hot fluid, or the like. By-products produced during the solid phase condensation polymerization may be removed by purging the reactor with inert gas or by applying vacuum thereto. In addition, the wholly aromatic liquid crystal polyester resin may include a variety of repeating units in the chain thereof. For example, the repeating units are as follows.

(1) Repeating unit induced from aromatic hydroxycarboxylic acid:

(2) Repeating unit induced from aromatic diol:

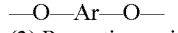

(3) Repeating unit induced from aromatic diamine:

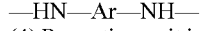

(4) Repeating unit induced from aromatic hydroxylamine:

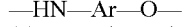

(5) Repeating unit induced from aromatic amino carboxylic acid:

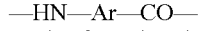

In the formulae defined above, Ar may be phenylene, biphenylene, naphthalene, an aromatic compound in which two phenylenes are bonded to each other via a carbon or non-carbon element, or an aromatic compound selected from the group consisting of phenylene, biphenylene, naphthalene, or two phenylenes bonded to each other via a carbon or non-carbon element in which at least one hydrogen atom is substituted with other elements.

The fiberweb may include fibers having an average diameter in the range of 1 to 9,000 nm. When the average diameter of the fibers is within this range, a filter including the fiberweb has high filtering efficiency because surface areas of the fibers per unit area are large, and the fiberweb has sufficient physical strength as a filter material.

The fiberweb may further include an additive such as titanium oxide ($TiO_2$) and/or carbon black. The amount of the additive may be in the range of 5 to 10 parts by weight based on 100 parts by weight of the wholly aromatic liquid crystal polyester resin. When the amount of the additive is within this range, adhesion strength between the fibers of the fiberweb may be improved.

Hereinafter, a method of preparing the fiberweb will be described in detail.

According to another embodiment of the present invention, a method of preparing the fiberweb includes electrospinning a wholly aromatic liquid crystal polyester resin-containing solution or melt-spinning a wholly aromatic liquid crystal polyester resin.

The term "electrospinning" as used herein refers to a process whereby a polymer solution is spun to a low potential collector through a nozzle to which a high voltage is applied and then polymers in the polymer solution is stretched by an electric field, and the term "melt-spinning" as used herein refers to a process whereby polymers are melted and extruded into air through a nozzle and the resultant polymers are cooled and solidified, thereby forming a fiberweb.

The wholly aromatic liquid crystal polyester resin-containing solution may include the wholly aromatic liquid crystal polyester resin as described above; and one solvent selected from the group consisting of trifluoromethanesulfonic acid, pentafluorophenol, 3,5-bis(trifluoromethyl)phenol, p-fluorophenol, p-chlorophenol, 1,1,2,2-tetrachloroethane, trifluoroacetic acid, hexafluoroisopropanol, chloroform, dichloromethane, tetrahydrofuran, dioxane, and any combinations thereof. That is, the solvent may dissolve the wholly aromatic liquid crystal polyester resin.

The concentration of the wholly aromatic liquid crystal polyester resin-containing solution may be appropriately selected in the range of 1% (weight/volume %) or lower to 50% (weight/volume %) or higher according to the type of the solvent used (e.g., 1% (weight/volume %) to 50% (weight/volume %)). In addition, the concentration of the wholly aromatic liquid crystal polyester resin-containing solution may be determined further considering a distance between a nozzle and a collector of an electrospinning device, a potential difference therebetween, and an amount of the solution that is discharged from the nozzle.

Surfaces of a nozzle and a collector used in the electrospinning process may be formed of platinum, silver, tungsten, copper, stainless steel, or alloys thereof. For example, the surfaces of a nozzle and a collector may be formed of platinum-coated stainless steel.

To improve the physical strength of the fiberweb formed by electrospinning, the fiberweb may be attached to various materials such as non-woven fabric, paper, or synthetic fiber by hot air, calendaring, needle punching, hydroentanglement, or chemical bonding.

The fiberweb prepared using the method as described above may be used as a separator for a secondary battery or a filter for an automobile such as an oil filter or an air filter.

According to another embodiment of the present invention, a filter includes the fiberweb. For example, the filter may be a filter prepared by attaching the fiberweb to non-woven fiber by calendaring, for example, an ultra low penetration air (ULPA) filter or a high efficiency particulate air (HEPA) filter. In this regard, the term "ULPA filter" refers to a filter capable of filtering at least 99.999% of particles having a size of 120 nm or larger, and the term "HEPA filter" refers to a filter capable of filtering at least 99.97% of particles having a size of 0.3 μm or larger. The particles that are filtered through the filter may be dust, a pollutant, mold, and/or bacteria.

One or more embodiments of the present invention will now be described in more detail with reference to the following examples. However, these examples are not intended to limit the scope of the one or more embodiments of the present invention.

EXAMPLE 1

PREPARATION EXAMPLE 1

Preparation of Wholly Aromatic Liquid Crystal Polyester Resin 3.018 kg of p-hydroxybenzoic acid, 1.300 kg of 6-hydroxy-2-naphthoic acid, and 0.3 g of potassium acetate, as a catalyst, were added to a 10 L batch reactor, the temperature of which is controllable. Nitrogen gas was injected into the reactor to inactivate the inside of the reactor, and then 3.024 kg of acetic anhydride was added thereto. Then, the temperature of the reactor was raised up to 150° C. for 30 minutes and the hydroxy group of the monomers was acetylated at 150° C. for 2 hours. Thereafter, the temperature of the reactor was raised up to 320° C. for 5 hours and 20 minutes while removing acetic acid that was produced during the acetylation and maintained at this temperature for 20 minutes to prepare a wholly aromatic liquid crystal polyester prepolymer by condensation polymerization of the monomers. Acetic acid, which is a by-product of the preparation of the wholly aromatic liquid crystal polyester prepolymer, was also continuously removed during the preparation of the wholly aromatic liquid crystal polyester prepolymer with the acetic acid produced during the acetylation. Then, the wholly aromatic liquid crystal polyester prepolymer was collected from the reactor and cooled and solidified.

Then, the wholly aromatic liquid crystal polyester prepolymer was ground to have an average particle diameter of 1 mm, and 3 kg of the ground wholly aromatic liquid crystal polyester prepolymer was added to a 10 L rotary kiln reactor. The temperature of the reactor was increased up to 200° C. where weight loss is initiated for 1 hour while flowing nitrogen at a rate of 1 Nm$^3$/hr. Then, the temperature was increased up to 290° C. for 6 hours and maintained at the same temperature for 5 hours to prepare a wholly aromatic liquid crystal polyester resin. Then, the reactor was cooled to room temperature for 1 hour, and the wholly aromatic liquid crystal polyester resin was collected from the reactor.

PREPARATION EXAMPLE 2

Preparation of Wholly Aromatic Liquid Crystal Polyester Resin Solution 5 g of the wholly aromatic liquid crystal polyester resin prepared according to Preparation Example 1 was dissolved in 10 ml of pentafluorophenol on a hot plate at 80° C. without being stirred using a magnetic bar or a mechanical stirrer, and the resultant mixture was then dissolved in 20 ml of hexafluoroisopropanol to prepare a wholly aromatic liquid crystal polyester resin solution.

PREPARATION EXAMPLE 3

Preparation of Fiberweb from Wholly Aromatic Liquid Crystal Polyester Resin

The wholly aromatic liquid crystal polyester resin solution prepared according to Preparation Example 2 was provided to a nozzle of an electrospinning device (self-manufactured, a voltage was adjusted up to 50,000 V) by using a pump, and the wholly aromatic liquid crystal polyester resin solution in the nozzle was spun to a collector positioned below the nozzle, thereby preparing a fiberweb. In this regard, 50,000 V was applied between the nozzle and the collector, and the wholly aromatic liquid crystal polyester resin solution was discharged from the nozzle at a rate of 0.5 ml/min. In addition, surfaces of the nozzle and the collector were platinum-coated stainless steel, and a distance between the nozzle and the collector was 40 cm. To separate the fiberweb prepared from the wholly aromatic liquid crystal polyester resin solution from the collector without damage, a Teflon film was disposed on the collector and the wholly aromatic liquid crystal polyester resin solution was then spun to a surface of the Teflon film. Then, a solvent was removed from the prepared fiberweb by using a heat gun at 80° C.

PREPARATION EXAMPLE 4

Preparation of Filter

The fiberweb (thickness: 5,000 nm) prepared according to Preparation Example 3 was attached to polypropylene spunbond non-woven fiber (110 g/m$^2$) by using a calendaring device (manufactured by Seoul system). In this regard, the attachment process was performed at 200° C. Then, the resultant structure was dried at 130° C. for at least 4 hours by using an oven dryer (available from ASUNG PLANT) to reduce a moisture content below 200 wtppm, thereby completing the preparation of a filter.

COMPARATIVE EXAMPLE 1

For performance comparison with the filter prepared according to Preparation Example 4, a widely used fiberweb (HPFT1S non-woven fiber from C&S) prepared by attaching a polypropylene fiberweb having a thickness of 5,000 nm to a polypropylene spunbond non-woven fiber with a weight of 110 g/m$^2$ was purchased.

EVALUATION EXAMPLE

EVALUATION EXAMPLE 1

Evaluation of Average Diameter of Fiber

An average diameter of fibers in the fiberweb of each of the filters prepared according to Example 1 and Comparative Example 1 was measured using an optical microscope (YS1-T Nikon) and a scanning electron microscope (Hitachi S-3500). In particular, 200 samples for each filter were collected by varying sampling positions, diameters of fibers in the fiberweb included in each sample were measured, and an average of the diameter values, which is an average diameter of the fibers, was obtained. A standard deviation of the measured average diameter of the fibers was ±0.05%. The evaluation results are shown in Table 1 below.

TABLE 1

|  | Average diameter |
| --- | --- |
| Example 1 | 1,000 nm |
| Comparative Example 1 | 9 μm |

Referring to Table 1 above, fibers in the fiberweb of the filter of Example 1 have an average diameter that is 1/9 times that of fibers in the fiberweb of the filter of Comparative Example 1.

EVALUATION EXAMPLE 2

Evaluation of Filtering Efficiency and Pressure Loss

Filtering efficiencies and pressure losses of the filters of Example 1 and Comparative Example 1 were evaluated using an automatic filter tester (available from TSI Inc., Model 8130). In this regard, a solid NaCl (average particle size: 0.26 μm) was used as an aerosol-forming material, a flow rate of air was 30 L/min, and a size of each sample was 10 cm×10 cm. In particular, 20 samples were stored at 30° C. for 24 hours and filtering efficiencies and pressure losses thereof were evaluated. Separately, additional 20 samples were stored at 150° C. for 24 hours and filtering efficiencies and pressure losses thereof were evaluated. In each case, an average of the measurement values of the 20 samples was obtained and the filtering efficiency and pressure loss of each filter were represented by the obtained average value. The evaluation results are shown in Table 2 below.

TABLE 2

|  | Storage temperature (° C.) | Filtering efficiency (%)*1 | Pressure loss (mmAq)*2 |
| --- | --- | --- | --- |
| Example 1 | 30 | 99.99 | 15 |
|  | 150 | 99.99 | 20 |
| Comparative Example 1 | 30 | 99.70 | 35 |
|  | 150 | 60.21 | 50 |

*1: filtering efficiency=(amount before passing through filter−amount after passing through filter)/amount before passing through filter×100

*2: pressure loss indicates a difference in pressure between front and rear sides of the filter Referring to Table 2 above, the filter of Example 1 exhibits higher filtering efficiency and lower pressure loss at both the low and high temperatures than those of the filter of Comparative Example 1. In addition, the filter of Example 1 maintained the same filtering efficiency at the high temperature as the low temperature.

The invention claimed is:

1. A fiberweb comprising a wholly aromatic liquid crystal polyester resin that comprises a repeating unit induced from a hydroxybenzoic acid and a repeating unit induced from a hydroxynaphthoic acid, but does not comprise a repeating unit induced from an aromatic dicarboxylic acid.

2. The fiberweb of claim 1, wherein the hydroxybenzoic acid is one selected from the group consisting of p-hydroxybenzoic acid, 3-hydroxybenzoic acid, 2-hydroxybenzoic acid, and any combinations thereof.

3. The fiberweb of claim 1, wherein the hydroxynaphthoic acid is one selected from the group consisting of 6-hydroxy-2-naphthoic acid, 3-hydroxy-2-naphthoic acid, 2-hydroxy-1-naphthoic acid, 1-hydroxy-2-naphthoic acid, and any combinations thereof.

4. The fiberweb of claim 1, wherein the wholly aromatic liquid crystal polyester resin comprises 70 to 80 parts by mol of the repeating unit induced from the hydroxybenzoic acid and 20 to 30 parts by mol of the repeating unit induced from the hydroxynaphthoic acid.

5. The fiberweb of claim 1, wherein the fiberweb comprises fibers having an average diameter in a range of 1 to 9,000 nm.

6. A method of preparing a fiberweb, the method comprising electrospinning a wholly aromatic liquid crystal polyester resin-containing solution or melt-spinning a wholly aromatic liquid crystal polyester resin,
    wherein the wholly aromatic liquid crystalline polyester resin comprises a repeating unit derived from a hydroxybenzoic acid and a repeating unit derived from a hydroxynaphthoic acid, but does not comprise a repeating unit derived from an aromatic dicarboxylic acid.

7. The method of claim 6, wherein the wholly aromatic liquid crystal polyester resin-containing solution comprises one solvent selected from the group consisting of trifluoromethanesulfonic acid, pentafluorophenol, 3,5-bis(trifluoromethyl)phenol, p-fluorophenol, p-chlorophenol, 1,1,2,2-tetrachloroethane, trifluoroacetic acid, hexafluoroisopropanol, chloroform, dichloromethane, tetrahydrofuran, dioxane, and any combinations thereof.

8. A filter comprising the fiberweb according to claim 1.

9. The filter of claim 8, wherein the filter is an ultra low penetration air (ULPA) filter or a high efficiency particulate air (HEPA) filter.

* * * * *